July 16, 1968 D. J. YEADON 3,392,764
BARK STRIPPING APPARATUS
Filed Oct. 21, 1965 9 Sheets-Sheet 1
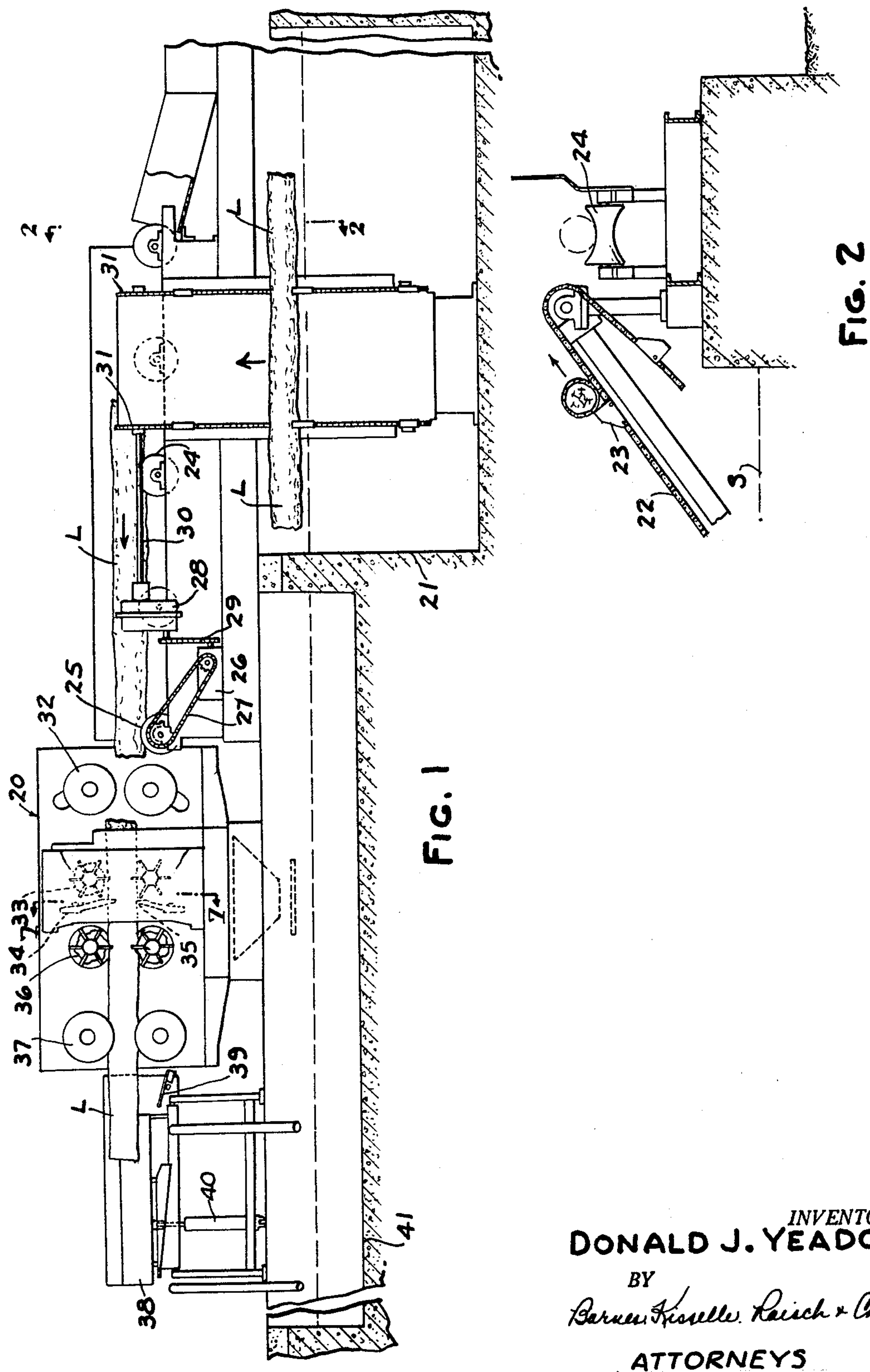
INVENTOR.
DONALD J. YEADON
BY
Barnes, Kisselle, Raisch & Choate
ATTORNEYS

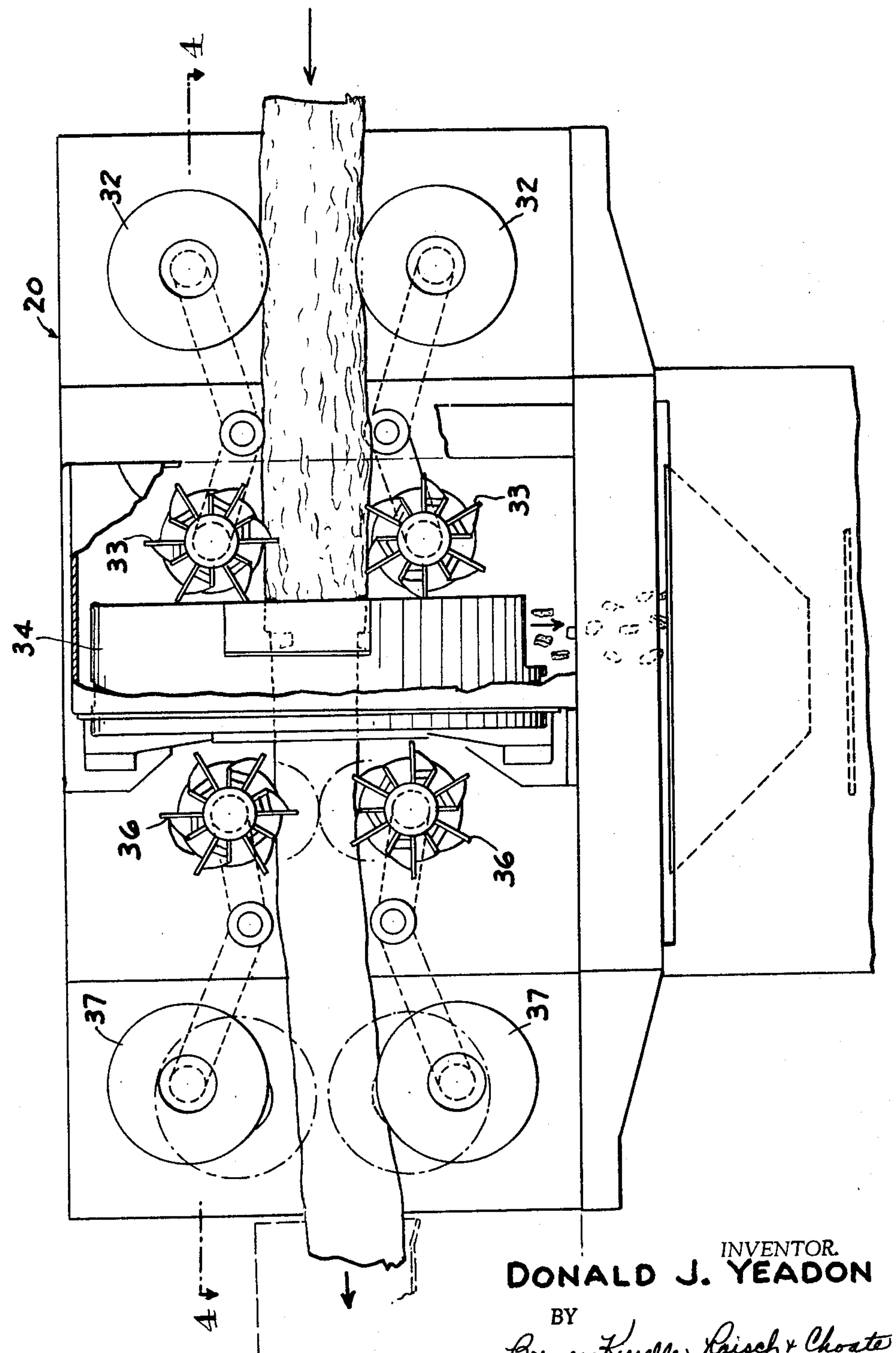
INVENTOR.
DONALD J. YEADON
BY
Barnes, Kisselle, Raisch & Choate
ATTORNEYS

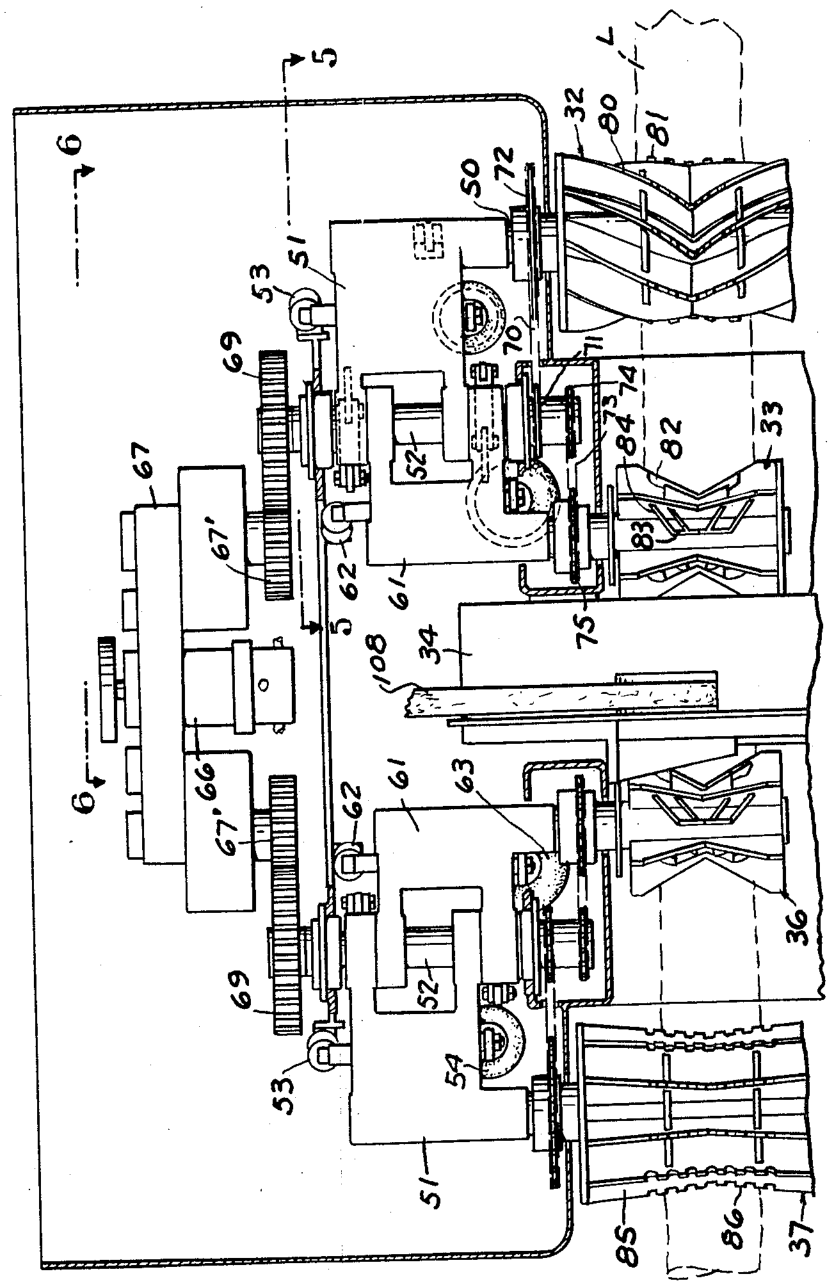
INVENTOR.
DONALD J. YEADON
BY
Barnes, Kisselle, Raisch & Choate
ATTORNEYS INVENTOR.
DONALD J. YEADON
BY
Barnes, Kisselle, Raisch & Choate
ATTORNEYS

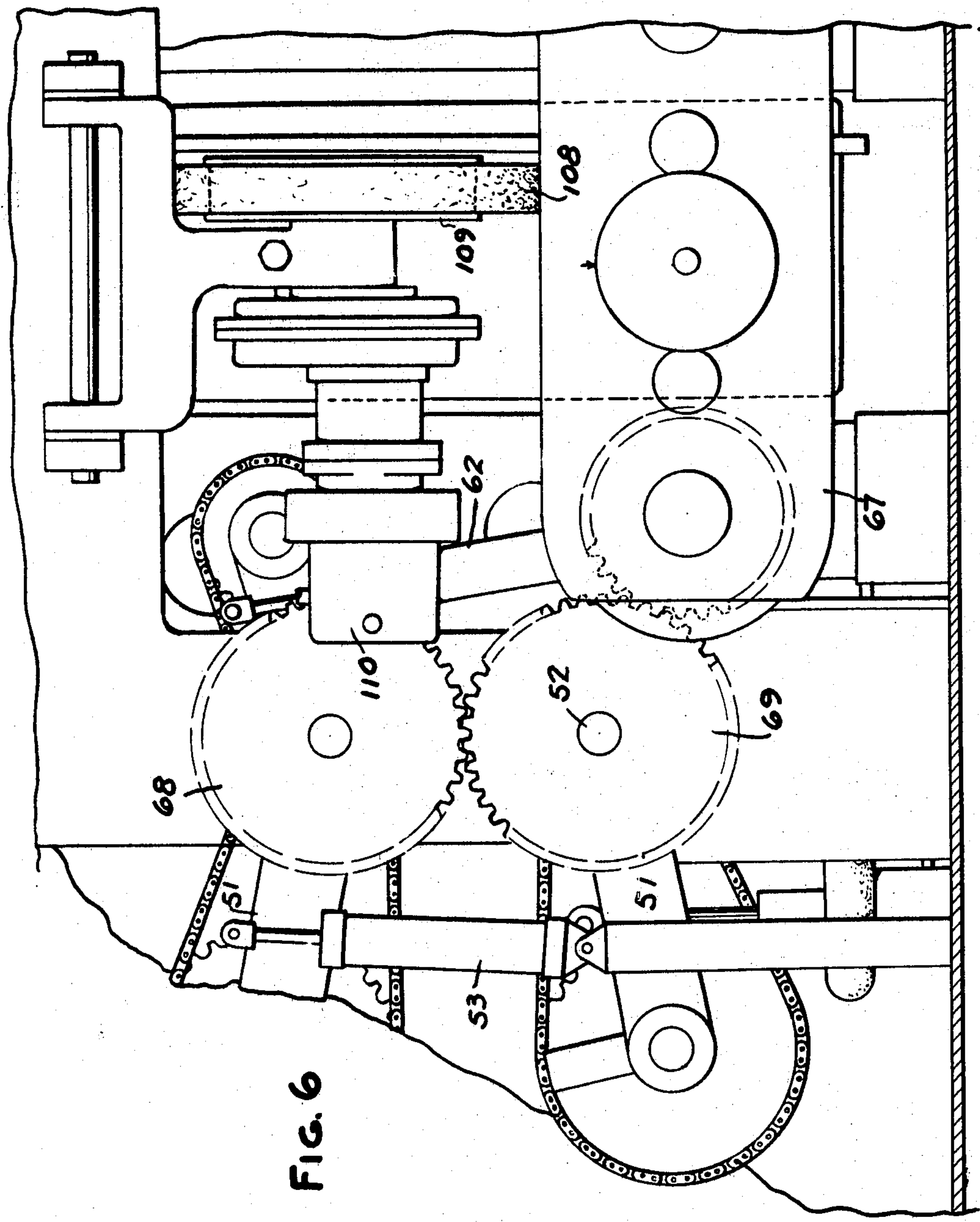
INVENTOR.
DONALD J. YEADON
BY
Barnes, Kisselle, Raisch & Choate
ATTORNEYS

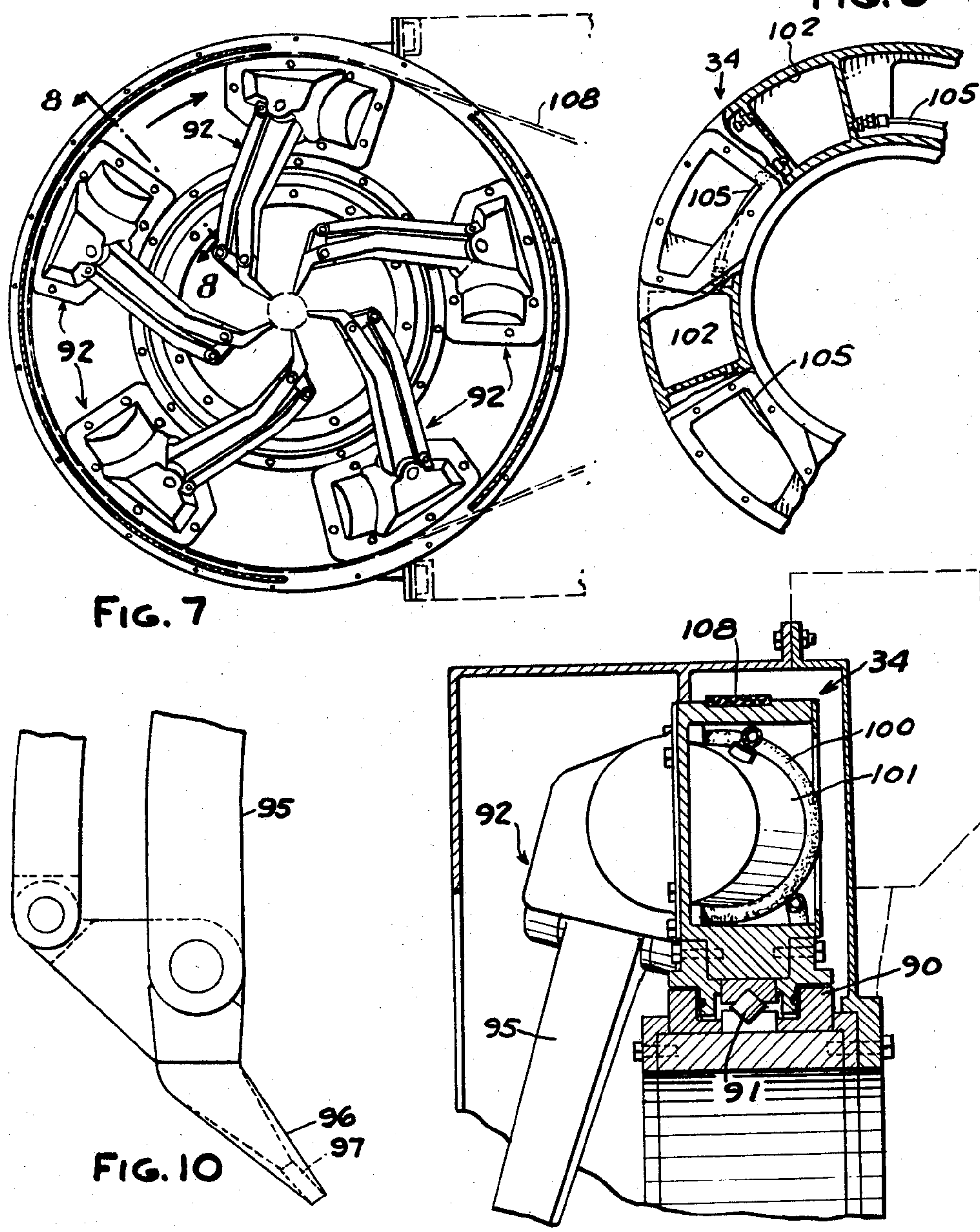
INVENTOR.
DONALD J. YEADON
BY
Barnes, Kisselle, Raisch & Choate
ATTORNEYS

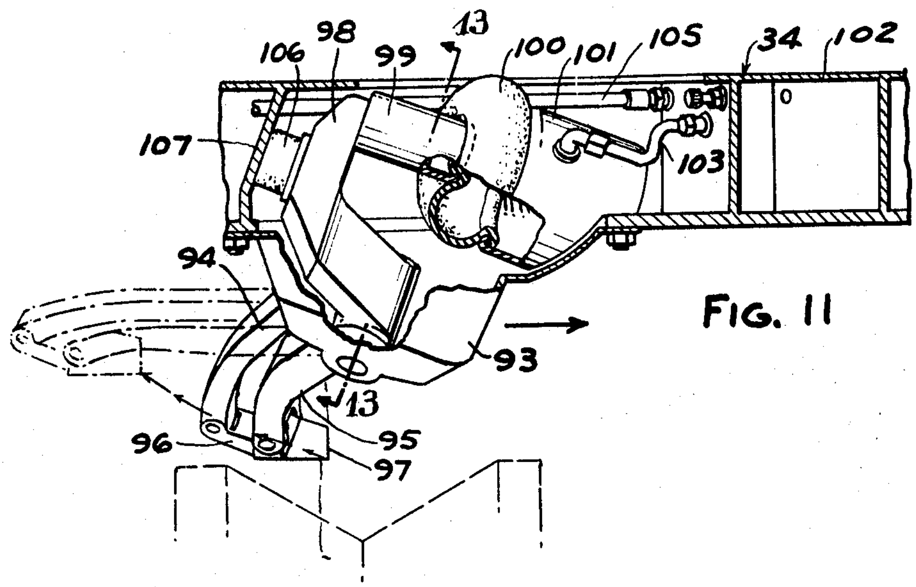
FIG. 11
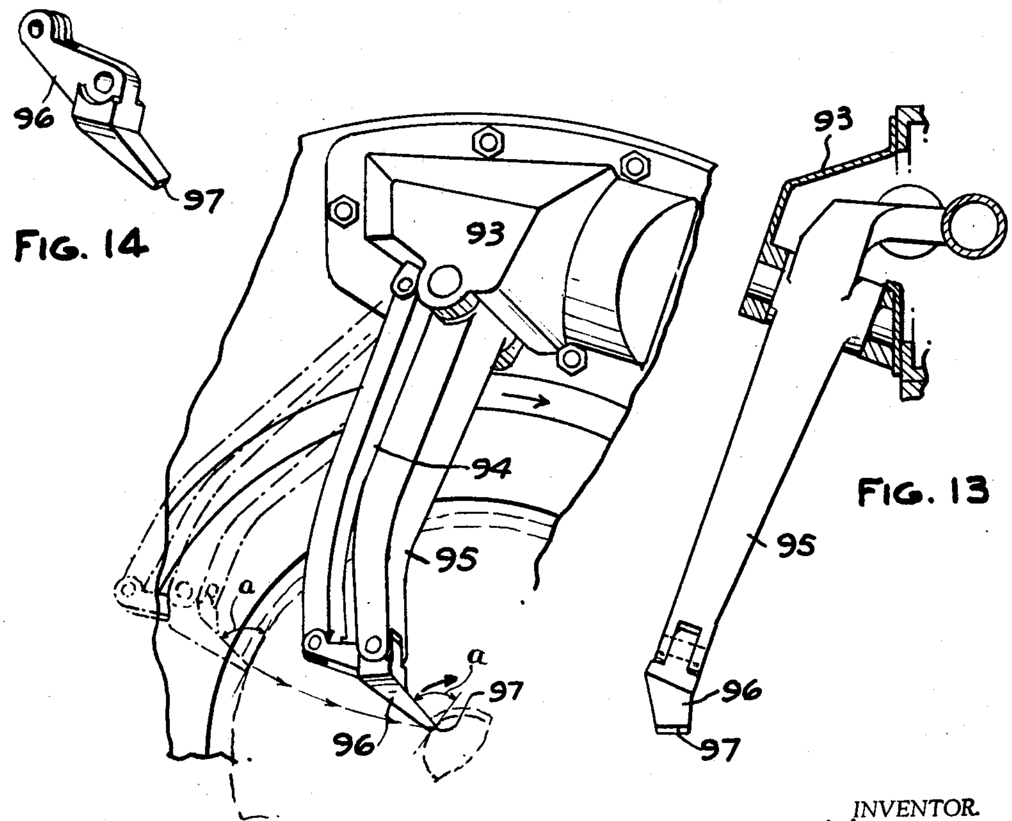
FIG. 14
FIG. 12
FIG. 13
INVENTOR
DONALD J. YEADON
BY
Barnes, Kisselle, Raisch & Choate
ATTORNEYS

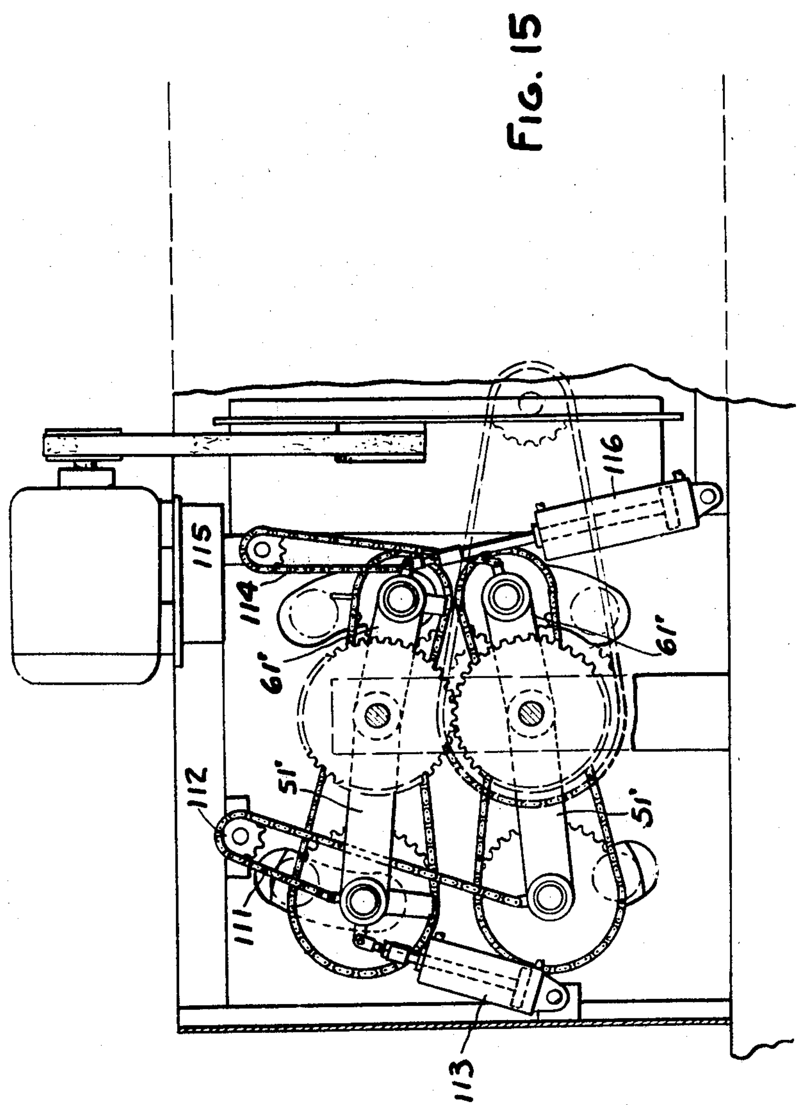
INVENTOR.
DONALD J. YEADON
BY
Barnes, Kisselle, Raisch & Choate
ATTORNEYS INVENTOR.
DONALD J. YEADON
BY
Barnes, Kisselle, Raisch & Choate
ATTORNEYS 3,392,764
Patented July 16, 1968

3,392,764

BARK STRIPPING APPARATUS

Donald J. Yeadon, Manitowoc, Wis., assignor to Board of Control of Michigan Technological University, Houghton, Mich.

Filed Oct. 21, 1965, Ser. No. 499,850
29 Claims. (Cl. 144—208)

ABSTRACT OF THE DISCLOSURE

The bark stripping apparatus disclosed herein comprises a machine to which logs are manually guided to an inclined endless conveyor that elevates the logs from a tank and delivers them to infeed rolls which, in turn, feed the logs axially to the bark stripping apparatus. The leading end of each log is grasped between a pair of feed rolls and is elevated and moved forwardly to a second pair of feed rolls which, in turn, guide the log through a rotor head that has a plurality of knives thereon. The rotor head is rotated continuously so that the knives strip the bark from the log as it moves through the head. As the log is moved through the rotor head, the leading end thereof passes between a third pair of feed rolls and then a fourth pair of feed rolls that guide the log and control the log as the trailing end of the log moves to the rotor head. The log then passes on to a tiltable tray which dumps the log into a second tank.

This invention relates to bark stripping apparatus.

It is an object of this invention to provide a bark stripping apparatus which will remove the bark from logs which are of varying sizes and also of varying shapes ranging from straight to crooked in two or more directions; wherein there is negligible wood loss; wherein the entire stripping is performed automatically without manual intervention; which will strip dry as well as freshly cut logs; and which will strip frozen logs.

In the drawings:

FIG. 1 is a partly diagrammatic side elevational view of an apparatus embodying the invention.

FIG. 2 is a fragmentary sectional view taken along the line 2—2 in FIG. 1.

FIG. 3 is a fragmentary part sectional elevation on an enlarged scale of a portion of the apparatus shown in FIG. 1.

FIG. 4 is a fragmentary sectional view taken along the line 4—4 in FIG. 3.

FIG. 6 is a fragmentary view taken along the line 6—6 in FIG. 4.

FIG. 7 is a fragmentary sectional view on an enlarged scale taken along the line 7—7 in FIG. 1.

FIG. 8 is a fragmentary sectional view on an enlarged scale taken along the line 8—8 in FIG. 7.

FIG. 9 is a transverse sectional view through the rotor head of FIG. 7.

FIG. 10 is a plan view of the stripper knife utilized in the rotor head of FIG. 7.

FIG. 11 is a part sectional plan view of a stripper knife assembly as viewed from the downstream end of the rotor head.

FIG. 12 is a fragmentary elevational view of a stripper knife assembly as viewed from the upstream end of the rotor head.

FIG. 13 is a fragmentary sectional view taken along the line 13—13 in FIG. 11.

FIG. 14 is a perspective view of a stripper knife.

FIG. 15 is a view similar to FIG. 5 of a modified form of the apparatus.

*General construction*

Figure 5:
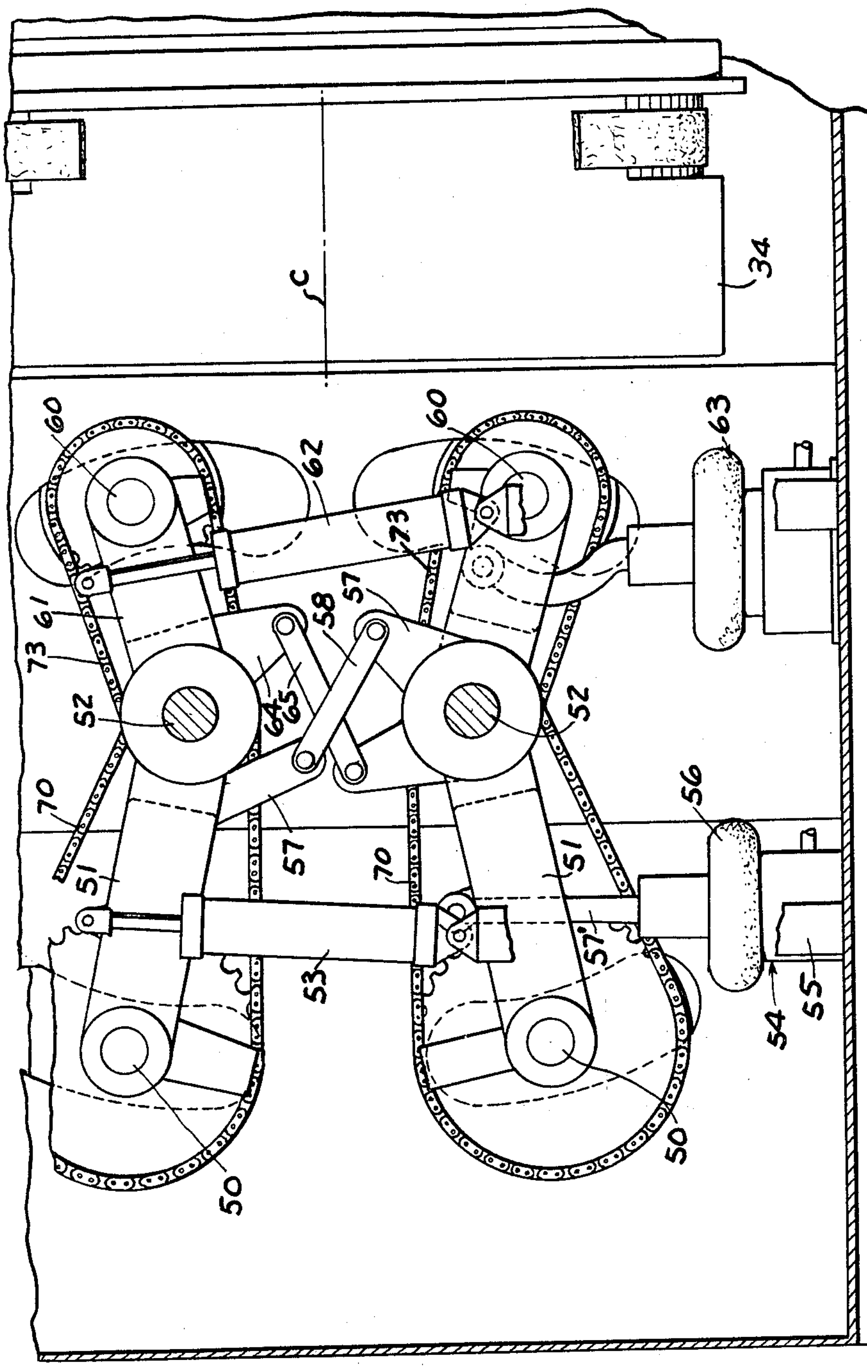
FIG. 5 is a fragmentary sectional view on an enlarged scale taken along the line 5—5 in FIG. 4.

The machine of the present invention is adapted to debark logs of varying sizes and particularly pulpwood sticks which normally vary in diameter from roughly four to twenty inches. Referring to FIGS. 1 and 2, the logs L, for example, pulpwood sticks which are to be debarked, are fed through the bark stripping apparatus. As shown in FIG. 1, the logs L are floated in a water tank 21 adjacent the inlet end of the machine where they are manually guided to an inclined endless conveyor 22 that has lugs 23 thereon which elevate the logs from the surface S of the water and deliver them to in-feed rolls 24 which, in turn, feed the logs L axially to the bark stripping apparatus 20. The endless conveyor 22 and the in-feed rolls 24 are driven by a motor 25 through a chain 27, a gear box 26, chain 29 and a second gear box 28 which rotates a shaft 30 that has sprockets 31 thereon over which the chains of the endless conveyor 22 are trained.

The leading end of each log L is grasped between a first pair of feed rolls 32 and is elevated, as presently described, and moved forwardly to a second pair of feed rolls 33 which, in turn, guide the log through a rotor head 34 that has a plurality of knives 35 thereon. The rotor head 34 is rotated continuously so that the knives strip the bark from the log as it moves through the head. As the log is moved through the rotor head 34, the leading end thereof passes between a third pair of feed rolls 36 and then a fourth pair of feed rolls 37 that guide the log and control the log as the trailing end of the log moves through the rotor head 34.

Finally, the log L with the bark removed therefrom passes outwardly onto a tiltable tray 38. When the trailing end of the log leaves the last pair of rolls 37, it falls onto tray 38 and engages a switch 39 which controls a dumping cylinder 40 that tilts the tray 38 so that the stripped log L rolls into a second water tank 41 at the discharge end of the machine.

*The feeding and guiding rolls*

Referring to FIGS. 3, 4 and 5, the rolls 32, 33, 36, 37 are adapted to center and grip the log and move it through the bark stripping apparatus as is more completely described hereinafter. Each roll of each pair is mounted for movement in unison toward and away from the other so that as one of each pair moves inwardly, the other also moves inwardly, and as one of each pair moves outwardly, the other also moves outwardly. As a result, each roll of each pair is always equidistant from the axis of the rotor head.

The arrangement, mounting and drive for rolls 32 and 37 are the same and the arrangement, mounting and drive for rolls 33 and 36 are the same. Therefore the following description of the arrangement, mounting and drive for rolls 32 and 33 will apply similarly to rolls 37 and 36, respectively.

Referring specifically to FIGS. 4 and 5, each roll 32 is fixed on a shaft 50 that is journalled in an arm 51 which is mounted for swinging movement on a shaft 52. Shafts 52 are vertically aligned as shown in FIG. 5. A shock absorber 53 extends from upper arm 51 to the frame of the machine and dampens the movements of the arms 51 and, in turn, of the rolls 32 toward one another. As further shown in FIG. 5, the arms 51 include extensions 57 which are interconnected by a link 58 that operates to interconnect arms 51 so that they are counterbalanced and move in unison toward and away from one another with respect to the center line C of the rotor head.

The arms 51 are yieldingly urged toward one another by an air spring assembly 54 which comprises a cylinder 55 that has a resilient wall 56 forming a sealed chamber. A rod 57' is pivoted at one end to the lower arm 51 and engages the resilient wall 56 at its other end. Air under pressure is sealed in the air spring so that the arms 51 and, in turn, the rolls 32 are yieldingly urged toward one another. As the arms 51 are moved away from one another by movement of a log between the rolls, the pressure in cylinder 55 increases. As a result, the rolls 32 are yieldingly urged toward one another with greater force as the diameter of the log increases. This compensates for the greater weight of the larger diameter logs.

The second pair of rolls 33 are similarly mounted on shafts 60 that are journalled in arms 61 which are mounted for swinging movement on shafts 52. A shock absorber 62 extends between upper arm 61 and the frame of the machine. An air spring 63 of similar construction to the air spring 54 is connected to lower arm 61 and yieldingly urges the arms 61 toward one another. The arms 61 include extensions 64 which are connected by a link 65 so that the arms move in unison. The force of the air springs 63 that urges each pair of rolls 33, 36 toward one another is preferably greater than the force of the air springs 54 that urges each pair of rolls 32, 37 toward one another. The rolls 33, 36 are in close proximity to the rotor head 34 to freely hold the log as it is moved through the head 34, as presently described.

The drive for the rolls 32, 33, 36 and 37 comprises a hydraulic motor 66 (FIG. 4) connected to a gear box 67. The output gears 67' of gear box 67 drive intermeshing gears 68, 69 on the shafts 52. Chains 70 are trained over sprockets 71 on shafts 52 and sprockets 72 on the shafts 50 to rotate the first set of rolls 32. Similarly, chains 73 are trained over sprockets 74 on the shafts 52 and sprockets 75 on the shafts 60 to drive the rolls 33.

As shown in FIGS. 3 and 4, each of the rolls 32, 33, 36, 37 has generally radially extending vanes. Specifically, the rolls 32 include radially extending vanes 80 that are generally chevron shaped so that they present a pair of opposed V-shaped rotating jaws which tend to center the logs. In addition, the vanes 80 have the apexes of the "V" displaced circumferentially of the rolls 32 in a direction opposite to the direction of the rotation of rolls (FIG. 4). As shown in FIG. 1, the in-feed rolls 24 are positioned so that the leading end of a log, when supported by in-feed rolls 24, has its axis below the center line C of the rotor head and, in turn, the midpoint between the axes of the rolls 32. Thus, the leading end of a log L first strikes the lowermost roll 32 and the vanes 80 engage the end of the log, tend to center it and lift and feed it forward between the rolls 32. As the leading end of a log L is grasped between the rolls 32, the rolls 32 move outwardly from their normal inaperture position away from one another in unison and continue to grip and feed the leading end of the log L forwardly between the next pair of rolls 33. The opposed V-shaped vanes 80 exert a strong lateral restraining force on the log. As shown in FIG. 4, the chevron shaped vanes are formed with teeth 81 which are hardened and serve as a means for firmly grasping the log L.

The second and third sets of rolls 33, 36 are identical to one another and include straight opposed V-shaped vanes 82 which also grip and center the log. In addition, the rolls 33 include narrower V-shaped vanes 83 and webs 84 which interconnect each vane 82 with the next successive vane 83 (FIG. 4). The included angle of vanes 82 is less than the included angle of the vanes 80 on rolls 32 so that as the log moves between rolls 33, the lateral centering force of the rolls 33 overpowers the lateral centering force of the rolls 32 and the portion of the log adjacent the rotor is closely centered in a lateral direction. The interconnected movement in unison of the upper and lower rolls of each pair of rolls 33, 36 tends to vertically center the log with respect to the rotor member 34. The narrow and wide vanes 83, 82, respectively, between each pair of rolls are adapted to intermesh so that when the rotation of the rolls are synchronized, there is no metal-to-metal contact between opposing rolls. Webs 84 are disposed at an acute angle to the center radial plane of the roll and are provided with arcuate outer edges which conform to the conical paths of rotation of the V-shaped vanes 82 and 83. These webs 84, being at acute angles, serve to restrain the log against circumferential rotation with the rotor 34 without restricting lateral centering.

As shown in FIG. 4, each roll 37 of the fourth pair of rolls also includes radial inverted V-shaped vanes 85. However, the included angle of the vanes 85 is much greater than that of the vanes of the rolls 33, 36 so that there is less horizontal or lateral restraint of the leading end of the log when engaged by rolls 37. Each vane 85 is formed with hardened teeth 86 to facilitate the gripping of the log L. The minimum lateral restraint of rolls 37 insures that the centering of the log will be primarily under control of rolls 36 and 33.

It will be seen that three distinct types of rolls are employed in combination:

(1) Rolls 32 which exert a strong initial centering tendency which rapidly decreases.

(2) Rolls 33 and 36 which maintain a strong centering tendency in the work area and act to prevent rotation of the log.

(3) Rolls 37 which exert only a very minimum lateral centering tendency.

*The rotor knife head*

Referring to FIGS. 7–14, the rotor head 34 comprises an annular frame that is rotatably mounted on a hub 90 by bearings 91. A plurality of stripper knife assemblies 92 are mounted circumferentially along one face of the rotor head 34. Specifically, each knife assembly 92 includes a bracket 93 which has a pair of arms 94, 95 pivoted thereto and a stripper knife 96 interconnecting the free ends of the arms (FIGS. 11–14) to form a parallelogram linkage. The plane of the parallelogram is such that one edge 97 of the knife always remains parallel to the axis of the rotor head 34. In addition, the plane of the parallelogram linkage is at an angle to the axis of the rotor head and to a radial plane of the rotor head so that the arms 94, 95 and, in turn, the knife edges 97 move simultaneously radially outwardly and axially in the direction of movement of the log L through the rotor member 34. As shown in FIG. 12, it will be observed that as knives 96 swing outwardly they travel in arcs which extend in the direction of rotation of head 34. In addition, it will be further noted that the angle designated *a* in FIG. 12, which the blade makes with the periphery of the log, remains constant with logs of different dimensions. It will also be observed that arms 94, 95 incline radially inwardly and axially in a direction opposite to the direction of travel of a log through head 34.

In order to yieldingly urge each stripper knife 96 radially inwardly, the free end 98 of each arm 95 extends within the bracket 93 and engages a piston member 99 that acts on a resilient end wall 100 of an air spring (FIG. 11). The air spring includes a fixed cylinder wall 101. Each of the air springs has the interior chamber thereof interconnected to the others so that the pressures acting on all the knives tend to be equal. In the event that an increased volume is desired to decrease the rate of pressure increase as the knives are moved outwardly, an auxiliary chamber 102 is formed in the rotor member 34 and is connected by a line 103 to the interior of the air spring. Lines 105 interconnect successive air springs.

In addition to providing a force on each knife which tends to increase as the diameter of the log increases, the air springs as described herein provide a means for readily controlling the knife pressure by varying the initial pressure of the air entrapped in the air springs. In addition, in the case of jamming or the like, the pressure on the knives 97 can be readily relieved by releasing the air pressure within the air springs by a suitable venting valve.

As shown in FIG. 11, a resilient bumper 106 is provided between the end 98 of each arm 95 and a stop 107 on the rotor member 34 to limit the extent of radial inward movement of knives 96.

As shown in FIGS. 4, 6, 7 and 8, the rotor head 34 is rotated by an endless belt 108 that is trained over the periphery of the rotor head and a pulley 109 that is driven by a hydraulic motor 110.

*Modified roll support*

In the modified form of the invention shown in FIG. 15, the arms that support each pair of rolls are interconnected by chains in order to provide for simultaneous inward and outward movement toward and from one another. Specifically, a chain 111 has one end thereof connected to arm 51' and the other end thereof connected to the other arm 51' and is trained over an idler sprocket 112 fixed to the frame of the machine. Thus, as one roll 32 moves inwardly or outwardly, the other also moves a corresponding distance. In this form of the invention, an air cylinder 113 yieldingly urges the arms toward one another. Similarly, the rolls 33 are connected to move toward and away from one another by a chain 114 which interconnects the arms 61' and is trained over an idler sprocket 115. An air cylinder 116 yieldingly urges the arms toward one another.

*Operation*

The operation of the bark stripping apparatus can be more readily understood with reference to FIGS. 1–3 and 16–19.

Figure 16:
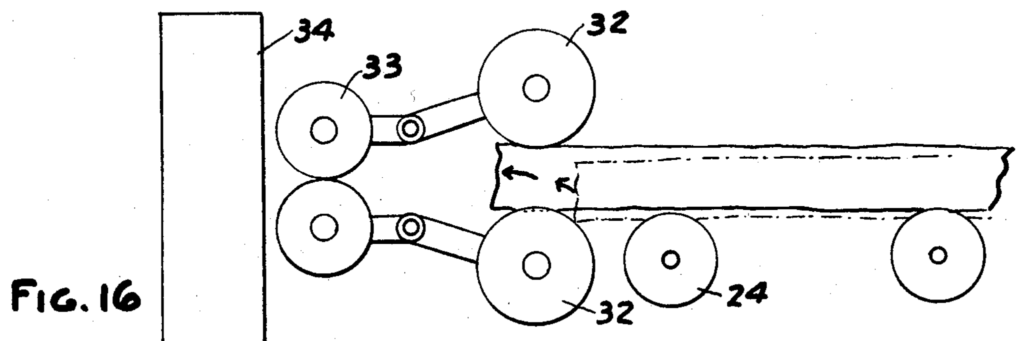
FIGS. 16–19 are diagrammatic views showing the movement of logs of different shapes through the bark stripping apparatus.

As the leading end of a log L is advanced by in-feed rolls 24, the axis of the log L is below the center line of the rotor head 34 as shown in solid lines in FIG. 1 and broken lines in FIG. 16. As the leading edge of the log engages the lowermost roll 32, the chevron shaped vanes elevate the leading end of the log L and center it horizontally with respect to the apparatus. As the leading end of the log L is elevated, it is carried between the rolls 32 which move apart equal distances with respect to the axis of the rotor head and grip the leading end of the log L feeding it inwardly toward the succeeding rolls 33. Since the log advances in an upwardly inclined position (FIG. 16), its leading end strikes upper roll 33, pivots the latter upwardly and advances between rolls 33. The leading end of the log is forced downwardly by upper rolls 33 and when the log is engaged on its underside by lower roll 33, the leading end is vertically centered relative to the rotor head 34. The rolls 33, in turn, feed the leading end of the log inwardly toward the knives of the rotor head 34 which is being continuously rotated. The rolls 33 are closely adjacent the knives and thereby hold the leading end of the log L firmly in a laterally and vertically centered position as it engages the knives. As the knives are struck by the blunt leading end of the log, the forward movement of the log causes the knives to swing in a generally radial arc which extends circumferentially in the direction of rotation of head 34 and axially in the direction of log travel. This reduces to a minimum the effort required to shift the knives radially outwardly into position to engage the bark on the periphery of the log. The stripping action is due to the breaking of the adhesion of the bark to the log in accordance with the cambium shear principle.

As the leading end of the log L moves through the rotor member 34, it is engaged by the succeeding rolls 36 which move outwardly in unison and grip the log and begin to pull it through the rotor member. Thus, throughout the major portion of the length of the log L, the rolls 33, 36 firmly grip the portion of the log which is passing through the rotor member 34. Finally, the leading end of the log L moves between the last rolls 37 and the log is delivered to the tiltable tray 38.

Figure 17:
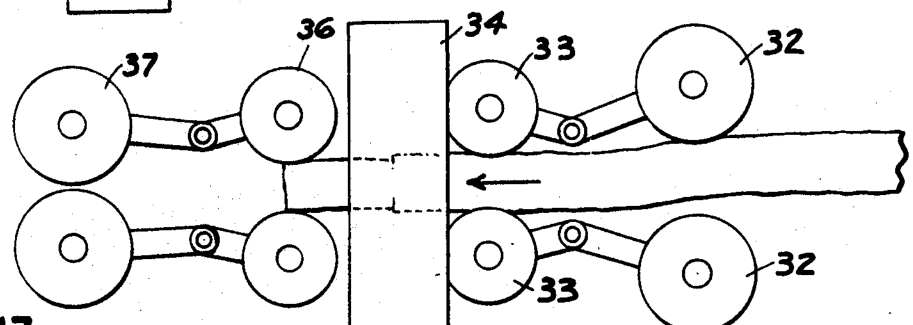

If the log is straight, it is gripped by each successive pair of rolls before it is released by the preceding pair of rolls. However, if the log is crooked, it is gripped firmly at times by only some of the rolls, as presently described. Thus, if an intermediate portion of the length of the log is curved upwardly, then as shown in FIG. 17 during a portion of movement through the bark stripping apparatus, only the upper roll 32 will be in contact with the log. Similarly, if the leading end of a log is curved downwardly, then as the log passes through the bark stripping apparatus, only the lower of the last rolls 37 will be in contact with the log during a portion of its travel through rotor head 34.

In the event that the log is bent in a horizontal direction, then the rolls 32, 37 may not center the bent portion of the log because the included angle between the rolls 32, 37 is not as great as the included angle between the vanes of the rolls 33 and 36. Proper centering of the log as it is being fed through rotor head 34 is also assured by the fact that air springs 63 exert a greater biasing force on rolls 33 and 36 than do air springs 54 on rolls 32 and 37.

Figure 18:
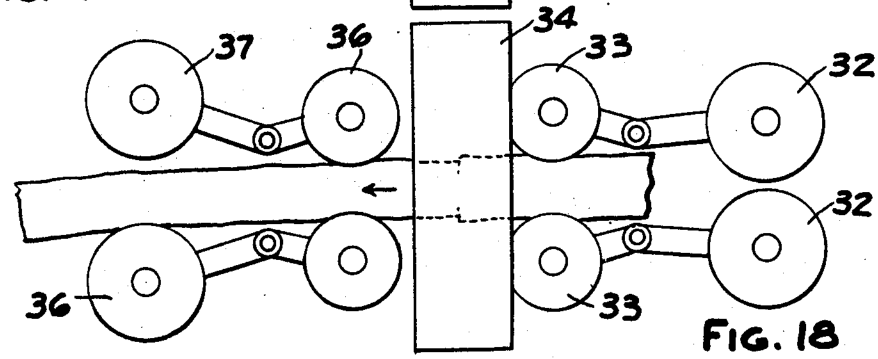
Figure 19:
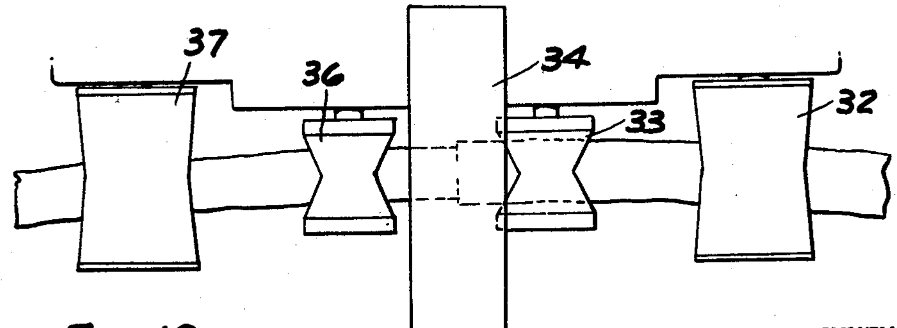

It can be appreciated that if the log is bent in both directions, then the log may at any interval of time have the rolls positioned in various combinations of the positions shown in the diagrammatic views, FIG. 17–19. In addition, the log may, due to the force of knives, be twisted about its axis as it is fed through the apparatus. In any event, the rolls 33, 36 serve to engage the log at any time that it is moving through rotor head 34 so that the firmest possible grip on the log is achieved as the knives rotate about the log. When the log is first entering the bark stripping apparatus as shown in FIG. 17 or leaving, the rolls 33 and 36, respectively, function to grip the log in a cantilever manner. During stripping of the intermediate length of the log where both sets of rolls 33, 36 strip the log, it is gripped in the manner of a conventional beam.

The use of air cylinders having resilient walls for urging the knives and the rolls inwardly insures fast response, negligible hysteresis, low inertia, obviates air leakage and reduces friction.

I claim:

1. In an apparatus for stripping bark from logs, the combination comprising a rotor head, means for supporting said rotor head for rotation about its axis, means for rotating said rotor head, a plurality of stripper members, means for mounting each said stripper member on said rotor head for guided movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetrically relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls.

2. The combination set forth in claim 1 wherein each of said first pair of rolls has generally radially extending vanes with radially outwardly directed V-shaped notches therein, each said vane having the apex of the V displaced circumferentially opposite to the direction of rotation of said roll relative to the outer ends of the V whereby when the leading end of an oncoming log engages the lowermost roll, it is centered by said vanes of said lowermost roll.

3. The combination set forth in claim 1 wherein said means yieldingly urging each said stripper member radially inwardly includes an air cylinder.

4. The combination set forth in claim 3 wherein said air cylinders are interconnected to one another.

5. The combination set forth in claim 1 wherein said means interconnecting each pair of said rolls comprises linkage means.

6. The combination set forth in claim 1 wherein said means interconnecting each pair of said rolls comprises a fixed sprocket and a chain trained over said sprocket and connected with said rolls at its opposite ends.

7. In an apparatus for stripping bark from logs, the combination comprising a rotor head, means for supporting said rotor head for rotation about its axis, means for rotating said rotor head, a plurality of stripper members, means for mounting each said stripper member on said rotor head for yielding movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetrically relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls, each of said first pair of rolls having generally radially extending vanes with radially outwardly directed V-shaped notches therein, each said vane having the apex of the V displaced circumferentially opposite to the direction of rotation of said roll relative to the outer ends of the V whereby when the leading end of an oncoming log engages the lowermost roll, it is centered by said vanes of said lowermost roll, and means for feeding a log to said first mentioned pair of rolls, the center line of the direction of feed of said log by said feeding means being below the axis of rotation of the rotor head whereby said vanes of said first gripping rolls tend to lift as well as center the leading end of an oncoming log.

8. In an apparatus for stripping bark from logs, the combination comprising a rotor head, means for supporting said rotor head for rotation about its axis, means for rotating said rotor head, a plurality of stripper members, means for mounting each said stripper member on said rotor head for yielding movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetrically relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls, each said roll having generally radially extending vanes which engage the log, said vanes having a generally V-shaped radially outwardly directed notch therein whereby said log is centered by engagement with said rolls, the included angle of the V-shaped notches in the vanes in the first and fourth pairs of rolls being greater than the included angle of the V-shaped notches in the vanes of the second and third pairs of rolls.

9. In an apparatus for stripping bark from logs, the combination comprising a rotor head, means for supporting said rotor head for rotation about its axis, means for rotating said rotor head, a plurality of stripper members, means for mounting each said stripper member on said rotor head for yielding movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetrically relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls, said means yieldably urging each said stripper member radially inwardly including an air cylinder, said air cylinders being interconnected to one another, each said air cylinder comprising a resilient wall which is mechanically connected to its respective stripper member.

10. In an apparatus for stripping bark from logs, the combination comprising a rotor head, means for supporting said rotor head for rotation about its axis, means for rotating said rotor head, a plurality of stripper members, means for mounting each said stripper member on said rotor head for yielding movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetricallly relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls, said means yieldably urging each pair of said rolls toward one another comprising an air spring.

11. In an apparatus for stripping bark from logs, the combination comprising a rotor head, means for supporting said rotor head for rotation about its axis, means for rotating said rotor head, a plurality of stripper members, means for mounting each said stripper member on said rotor head for yielding movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetrically relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls, shock absorber means connected to each pair of said rolls and operable to dampen the motion of said rolls toward one another.

12. In an apparatus for stripping bark from logs, the combination comprising a rotor head, means for supporting said rotor head for rotation about its axis, means for rotating said rotor head, a plurality of stripper members, means for mounting each said stripper member on said rotor head for yielding movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetrically relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls, said means for driving said rolls comprising a hydraulic motor.

13. In an apparatus for stripping bark from logs, the combination comprising a rotor head, means for supporting said rotor head for rotation about its axis, means for rotating said rotor head, a plurality of stripper members, means for mounting each said stripper member on said rotor head for yielding movement in a direction generally radially and forwardly in the direction of movement of a log through said rotor head, a first pair of superimposed gripping rolls mounted in advance of said rotor head, a second pair of superimposed gripping rolls mounted in advance of said rotor head between said first pair of gripping rolls and said head, a third pair of superimposed gripping rolls mounted adjacent said rotor head and beyond said rotor head, and a fourth pair of superimposed gripping rolls mounted beyond said third pair of rolls, the rolls in each pair being disposed symmetrically relative to the axis of rotation of said rotor head, means individual to each pair of said rolls for yieldingly urging said rolls toward one another, means interconnecting each pair of rolls to cause said rolls to move in unison toward and away from one another, and means for driving each pair of said rolls, said stripping members comprising knives and said means for mounting each said knife on said rotor head comprises a pair of spaced parallel arms pivotally mounted on said rotor head at one end thereof and pivotally connected to said stripper knife at the other end thereof thereby forming a parallelogram linkage between each said stripper knife and said rotor head.

14. In an apparatus for stripping bark from logs, the combination comprising a knife head member, a plurality of stripper knives, means for mounting each said stripper knife on said knife head for yielding movement in a direction generally radially of said head, each said stripper knife having an edge extending axially, a first superimposed pair of gripping rolls mounted in advance of said knife head, a second pair of superimposed gripping rolls mounted in advance of said knife head between said first pair of gripping rolls and said head, a third pair of superimposed gripping rolls mounted adjacent said knife head and beyond said knife head, and a fourth pair of superimposed gripping rolls mounted beyond said third pair of rolls, the rolls in each pair being disposed symmetrically relative to the axis of said knife head, means individual to each pair of said rolls for yieldingly urging said rolls toward one another, means interconnecting each pair of rolls such that they move radially inwardly and outwardly in unison, and means for driving each pair of said rolls, means for feeding a log to said first mentioned pair of rolls, the center line of the direction of feed of said log by said feeding means being below the axis of the knife head and wherein each of said first pair of rolls has generally radially extending vanes with radially outwardly directed V-shaped notches therein, said vanes having the apex of the V displaced circumferentially thereof disposed angularly opposite to the direction of rotation of said rolls in relation to the outer ends of the V whereby when the leading end of an oncoming log engages the lowermost roll, it is centered and elevated by said vanes of said lowermost roll.

15. In an apparatus for stripping bark from logs, the combination comprising
- a knife head member,
- a plurality of stripper knives,
- means for mounting each said stripper knife on said knife head for yielding movement in a direction generally radially of said head,
- each said stripper knife having an edge extending axially,
- a first superimposed pair of gripping rolls mounted in advance of said knife head,
- a second pair of superimposed gripping rolls mounted in advance of said knife head between said first pair of gripping rolls and said head,
- a third pair of superimposed gripping rolls mounted adjacent said knife head and beyond said knife head,
- and a fourth pair of superimposed gripping rolls mounted beyond said third pair of rolls,
- the rolls in each pair being disposed symmetrically relative to the axis of said knife head,
- means individual to each pair of said rolls for yieldingly urging said rolls toward one another,
- means interconnecting each pair of rolls such that they move radially inwardly and outwardly in unison,
- and means for driving each pair of said rolls,
- each said roll having generally radially extending vanes which engage the log,
- said vanes having a generally V-shaped radially outwardly directed notch therein whereby said log is centered by engagement with said rolls,
- the included angle of the V-shaped notches in the vanes in the rolls adjacent the knife head being less than the included angle of the V-shaped notches in the vanes of the rolls furthest from said knife head.

16. In an apparatus for stripping bark from logs, the combination comprising
- a knife head,
- a plurality of stripper knives
- means for mounting each said stripper knife on said knife head for movement in a direction generally radially of said head,
- each said stripper knife having an edge extending axially,
- and means yieldingly urging each said stripper knife radially inwardly including an air cylinder for each said knife,
- each said air cylinder comprising a resilient wall which is mechanically connected to its respective knife.

17. In an apparatus for stripping bark from logs, the combination comprising
- a knife head,
- a plurality of stripper knives,
- means for mounting each said stripper knife on said knife head for movement in a direction generally radially of said head,
- each said stripper knife having an edge extending axially,
- and means yieldingly urging each said stripper knife radially inwardly including an air cylinder for each said knife,
- said means for mounting each said knife on said knife head comprising a pair of spaced parallel arms pivotally mounted on said rotor member at one end thereof and pivotally connected to said stripper knife at the other end thereof thereby forming a parallelogram linkage between each said stripper knife and said knife head.

18. In an apparatus for stripping bark from logs, the combination comprising
- a rotor,
- means for rotating the rotor in one direction about a horizontal axis,
- means for feeding logs to be debarked axially through the rotor in one direction,
- means mounting a plurality of knives on the rotor comprising a plurality of arms pivotally supported at one end on the rotor at circumferentially spaced locations and having the knives mounted at the other end thereof,
- said arms extending radially inwardly of the rotor and being pivotally supported on the rotor such that when the arms swing in a radially outward direction, the knives at the inner ends of the arms swing in arcs which extend radially outwardly and circumferentially of the rotor in the direction of rotation thereof,
- and means biasing said arms to swing in a direction radially inwardly and wherein said arms are normally inclined axially in a direction opposite to the direction of travel of the logs fed through the rotor.

19. In an apparatus for stripping bark from logs, the combination comprising
- a rotor head,
- means for rotating the head about a fixed horizontally extending axis,
- means on said head for stripping bark from logs fed axially through the head,
- means spaced axially from one side of the head for feeding logs through the head comprising a set of radially aligned feed rolls disposed symmetrically relative to the axis of rotation of the head,
- means for rotating the feed rolls,
- means for mounting the feed rolls for movement in unison toward and away from the axis of rotation of the head and means for biasing said feed rolls toward said axis of rotation of the head,
- said log feeding means comprising a second set of radially aligned feed rolls disposed symmetrically relative to the axis of rotation of the head and spaced axially from the first set of feed rolls on the same side of the head,
- means for driving said second set of feed rolls,
- said second set of feed rolls also being mounted for movement in unison toward and away from the axis of rotation of the head,
- and means biasing the second set of feed rolls toward the axis of rotation of the head,
- the mounting means for the first and second set of feed rolls being such that the feed rolls in each set move independently of the feed rolls in the other set,
- the biasing means on the first set of feed rolls producing a greater biasing effect than the biasing means on the second set of feed rolls.

20. In an apparatus for stripping bark from logs, the combination comprising
- a knife head member,
- a plurality of stripper knives,
- means for mounting each said stripper knife on said knife head for yielding guided movement in a direction generally radially and forwardly in the direction of movement of a log through said head,
- each said stripper knife having an edge extending axially,
- a first superimposed pair of gripping rolls mounted in advance of said knife head,
- a second pair of superimposed gripping rolls mounted in advance of said knife head between said first pair of gripping rolls and said head,
- a third pair of superimposed gripping rolls mounted adjacent said knife head and beyond said knife head,
- and a fourth pair of superimposed gripping rolls mounted beyond said third pair of rolls,
- the rolls in each pair being disposed symmetrically relative to the axis of said knife head,
- means individual to each pair of said rolls for yieldingly urging said rolls toward one another, means interconnecting each pair of rolls such that they move radially inwardly and outwardly in unison,
and means for driving each pair of said rolls.

21. In an apparatus for stripping bark from logs, the combination comprising
a knife head,
a plurality of stripper knives,
means for mounting each said stripper knife on said knife head so that the stripper knife is normally disposed rearwardly and inwardly relative to the axis of an oncoming log and at an angle such that the stripper knife moves radially outwardly and forwardly as it is engaged by an oncoming log,
each said stripper knife having an edge extending axially,
and means yieldingly urging each said stripper knife radially inwardly including an air cylinder for each said knife.

22. In an apparatus for stripping bark from logs, the combination comprising
a rotor head,
means for rotating the head about a fixed horizontally extending axis,
means on said head for stripping bark from logs fed axially through the head,
means spaced axially from one side of the head for feeding logs through the head comprising a set of radially aligned feed rolls disposed symmetrically relative to the axis of rotation of the head,
means for rotating the feed rolls,
means for mounting the feed rolls for movement in unison toward and away from the axis of rotation of the head and means for biasing said feed rolls toward said axis of rotation of the head,
said log feeding means comprising a second set of radially aligned feed rolls disposed symmetrically relative to the axis of rotation of the head and spaced axially from the first set of feed rolls on the same side of the head,
means for driving said second set of feed rolls,
said second set of feed rolls also being mounted for movement in unison toward and away from the axis of rotation of the head,
and means biasing the second set of feed rolls toward the axis of rotation of the head,
the mounting means for the first and second set of feed rolls being such that the feed rolls in each set move independently of the feed rolls in the other set,
said mounting means comprising a transverse shaft,
and a cantilever arm pivoted to said shaft and individual to each said feed roll,
each said feed roll being rotatably mounted on the free end of its respective arm.

23. The combination set forth in claim 13 wherein said parallel arms lie in a plane disposed at an angle to the axis of the rotor member and to a radial plane of said rotor member,
said arms extending rearwardly and inwardly relative to the axis of an oncoming log and at an angle such that each said knife moves radially outwardly and forwardly in the direction of movement of the log as it is engaged by an oncoming log.

24. The combination set forth in claim 15 wherein said second and third pair of rolls include webs at an angle to said first mentioned vanes having arcuate edges for engaging the logs and restraining the logs against rotation relative to the knife head.

25. In an apparatus for stripping bark from logs, the combination comprising
a knife head,
a plurality of stripper knives,
means for mounting each said stripper knife on said knife head for yielding movement in a direction generally radially of said head,
each said stripper knife having an edge extending axially,
a pair of superimposed gripping rolls mounted in advance of said rotor head,
means for yieldingly urging said rolls toward one another,
means interconnecting said rolls such that they move radially inwardly and outwardly in unison,
means for driving said rolls,
means for feeding a log to said pair of rolls,
the center line of the direction of feed of said log by said feeding means being below the axis of the knife head,
said rolls having generally radially extending vanes with radially outwardly directed V-shaped notches therein,
said vanes having the apex of the V displaced circumferentially rearwardly with respect to the direction of rotation of said rolls in relation to the outer ends of the V whereby when the leading end of an oncoming log engages the lowermost roll, it is elevated and centered by said vanes of said lowermost roll.

26. The combination set forth in claim 17 wherein said parallel arms lie in a plane disposed at an angle to the axis of the knife head and to a radial plane of said knife head,
said arms extending rearwardly and inwardly relative to the axis of an oncoming log and at an angle such that each said knife moves radially outwardly and forwardly as it is engaged by an oncoming log.

27. In an apparatus for stripping bark from logs, the combination comprising
a rotor,
means for rotating the rotor in one direction about a horizontal axis,
means for feeding logs to be debarked axially through the rotor in one direction,
means mounting a plurality of knives on the rotor comprising a plurality of arms pivotally supported at one end on the rotor at circumferentially spaced locations and having the knives mounted at the other end thereof,
said arms extending radially inwardly of the rotor and being pivotally supported on the rotor such that when the arms swing in a radially outward direction, the knives at the inner ends of the arms swing in arcs which extend radially outwardly and circumferentially of the rotor in the direction of rotation thereof.

28. The combination set forth in claim 18 wherein the arms are pivotally supported such that when the arms swing radially outwardly they also move axially in the direction of log travel through the rotor.

29. The combination set forth in claim 19 wherein the feed rolls in each set comprises a pair of rolls disposed on diametrically opposite sides of the axis of rotation of the head.

References Cited

UNITED STATES PATENTS 2,908,302 10/1959 Mullis.
2,918,952 12/1959 Searle.
3,189,067 6/1965 Dillingham.

FOREIGN PATENTS 1,302,890 7/1962 France.

WILLIAM W. DYER, Jr., *Primary Examiner.*
W. D. BRAY, *Assistant Examiner.*